(12) United States Patent
Nilson

(10) Patent No.: US 7,228,615 B2
(45) Date of Patent: Jun. 12, 2007

(54) METHOD FOR MANUFACTURING A PERMANENT-MAGNET EXCITED ROTOR FOR A HIGH SPEED ELECTRIC MOTOR

(75) Inventor: Thord Agne Gustaf Nilson, Tyresö (SE)

(73) Assignee: Atlas Copco Air Power, naamloze vennootschap, Wilrijk (BE)

(*) Notice: Subject to any disclaimer, the term of this patent is extended or adjusted under 35 U.S.C. 154(b) by 404 days.

(21) Appl. No.: 10/297,921

(22) PCT Filed: Jan. 11, 2002

(86) PCT No.: PCT/BE02/00004

§ 371 (c)(1),
(2), (4) Date: Dec. 19, 2002

(87) PCT Pub. No.: WO02/056442

PCT Pub. Date: Jul. 18, 2002

(65) Prior Publication Data
US 2003/0182787 A1 Oct. 2, 2003

(30) Foreign Application Priority Data
Jan. 15, 2001 (EP) .................... 01200132

(51) Int. Cl.
*H02K 15/02* (2006.01)

(52) U.S. Cl. .................. 29/598; 29/596; 29/607; 29/732; 310/156.28

(58) Field of Classification Search .......... 29/596–598, 29/732, 736, 447; 310/156.22, 156.28, 153, 310/261
See application file for complete search history.

(56) References Cited

U.S. PATENT DOCUMENTS

| 4,617,726 | A | * | 10/1986 | Denk ........................... 29/598 |
| 4,742,259 | A | * | 5/1988 | Schaefer et al. ....... 310/156.28 |
| 4,759,116 | A | * | 7/1988 | Jones .......................... 29/598 |
| 4,910,861 | A | * | 3/1990 | Dohogne ..................... 29/598 |
| 5,457,870 | A | * | 10/1995 | Canders ...................... 29/598 |
| 5,794,326 | A | * | 8/1998 | Kikly .......................... 29/596 |
| 6,047,461 | A | * | 4/2000 | Miura et al. .................. 29/598 |
| 6,104,115 | A | * | 8/2000 | Offringa et al. ....... 310/156.28 |
| 6,144,130 | A | * | 11/2000 | Kawamura ............ 310/156.28 |
| 2003/0182787 | A1 | * | 10/2003 | Nilson ......................... 29/598 |

FOREIGN PATENT DOCUMENTS

| EP | 0459355 | 12/1991 |
| JP | 60-035945 | 2/1985 |
| JP | 62-166755 | 7/1987 |
| JP | 62-262643 | 11/1987 |
| JP | 03-018252 | 1/1991 |
| JP | 11-089142 | 3/1999 |
| JP | 2000-102201 | 4/2000 |

* cited by examiner

*Primary Examiner*—Minh Trinh
(74) *Attorney, Agent, or Firm*—Bacon & Thomas, PLLC

(57) ABSTRACT

The invention relates to a method for manufacturing a permanent-magnet excited rotor for a high speed electric motor, according to which method a support sleeve (1) is mounted with a pre-tension around the rotor body (2), characterised in that the sleeve is expanded by a liquid that solidifies and is solid at the working temperatures of the rotor, said liquid is injected under pressure between the sleeve and the rotor body and held under pressure during solidification.

10 Claims, 2 Drawing Sheets

METHOD FOR MANUFACTURING A PERMANENT-MAGNET EXCITED ROTOR FOR A HIGH SPEED ELECTRIC MOTOR

BACKGROUND OF THE INVENTION

1. Field of the Invention

This invention relates to a method for manufacturing a permanent-magnet excited rotor for a high speed electric motor, according to which method a support sleeve is mounted with a pre-tension around the rotor body.

"High speed" motor means here each motor having a maximum speed requiring a support sleeve to keep the rotor from breaking, more particularly to keep the magnets, which have very low tensile strength, from breaking.

In practice magnets can mostly resist forces of 50 to 70 kPa, while in high speed motors tensile forces higher than 100 kPa can exist at maximum speed.

For high speed permanent-magnet rotors, a support sleeve is also required to keep the magnets securely attached to the rotor body and maintain these magnets under compression under all operating speeds and temperatures of the rotor.

To accomplish this, the support sleeve must be mounted on the rotor with a specified minimum interference, which is usually done by thermal expansion of the sleeve.

When the play between the sleeve and the rotor body is too big, or when the sleeve material has a too low thermal or negative expansion coefficient, such as carbon fibre, the sleeve will not be able to exert a sufficient pre-tension to the rotor body.

2. Discussion of the Related Art

A combined thermal and mechanical method is disclosed in U.S. Pat. No. 5,568,681. A capsule tube is fixed to the rotor body by shrinkage fit. One of both parts formed by the capsule tube and the rotor body is first fixed in a vertical direction in relation to a counter-support, and the other part is released from a location above the first part so that it will fall within the fixed first part under the influence of gravity.

Another known method is to hydraulically expand the sleeve with for example oil, and then while the sleeve expanded, insert the rotor body into the sleeve and then remove the pressure.

This generally requires tight mechanical tolerances on sleeve and rotor body, and also that the rotor body should be considerably stiffer than the sleeve.

The tolerance of the modulus of elasticity of the sleeve is also important. The magnets must also be mounted on the rotor in a way so they do not move when the sleeve is mounted, otherwise they may move when rotating, causing a redistribution of mass in the rotor which in turn may severely affect the balancing of the rotor.

There is also a complication if the rotor body does not contain a central shaft, or can be made as one mechanical body.

SUMMARY OF THE INVENTION

The aim of the invention is to avoid the above mentioned drawbacks and to provide a method for manufacturing a permanent-magnet excited rotor which does not show the above-mentioned drawbacks and which permits a quick and simple manufacturing, requiring less severe conditions for the magnets and resulting in a rotor with better characteristics, permitting amongst others a higher rotational speed.

This aim is accomplished in a method according to which the sleeve is expanded by a liquid that solidifies and is solid at the working temperatures of the rotor, such as a thermo-setting plastic, more particularly an epoxy resin, or a metal alloy with a suitable melting point, said liquid is injected under pressure between the sleeve and the rotor body and held under pressure during solidification.

A rotor body may be used comprising two end pieces, the sleeve being mounted partially around these end pieces, liquid being preferably injected through at least one of these end pieces.

During injection, the ends of the sleeve are preferably clamped in the radial direction against the two end pieces.

A rotor body may be used optionally comprising a shaft joining the end pieces together.

A rotor body may be used which contains permanent magnets, the sleeve surrounding these magnets and at least partially the end pieces.

The method of the invention permits an embodiment wherein a rotor body is used without pre-manufactured magnets, but wherein the magnets are formed in situ by injecting a mixture of the liquid that solidifies and a magnetic powder.

BRIEF DESCRIPTION OF THE DRAWINGS

The invention will now be described by way of example and with reference to the accompanying drawings, in which.

DESCRIPTION OF THE PREFERRED EMBODIMENT

Figure 1:
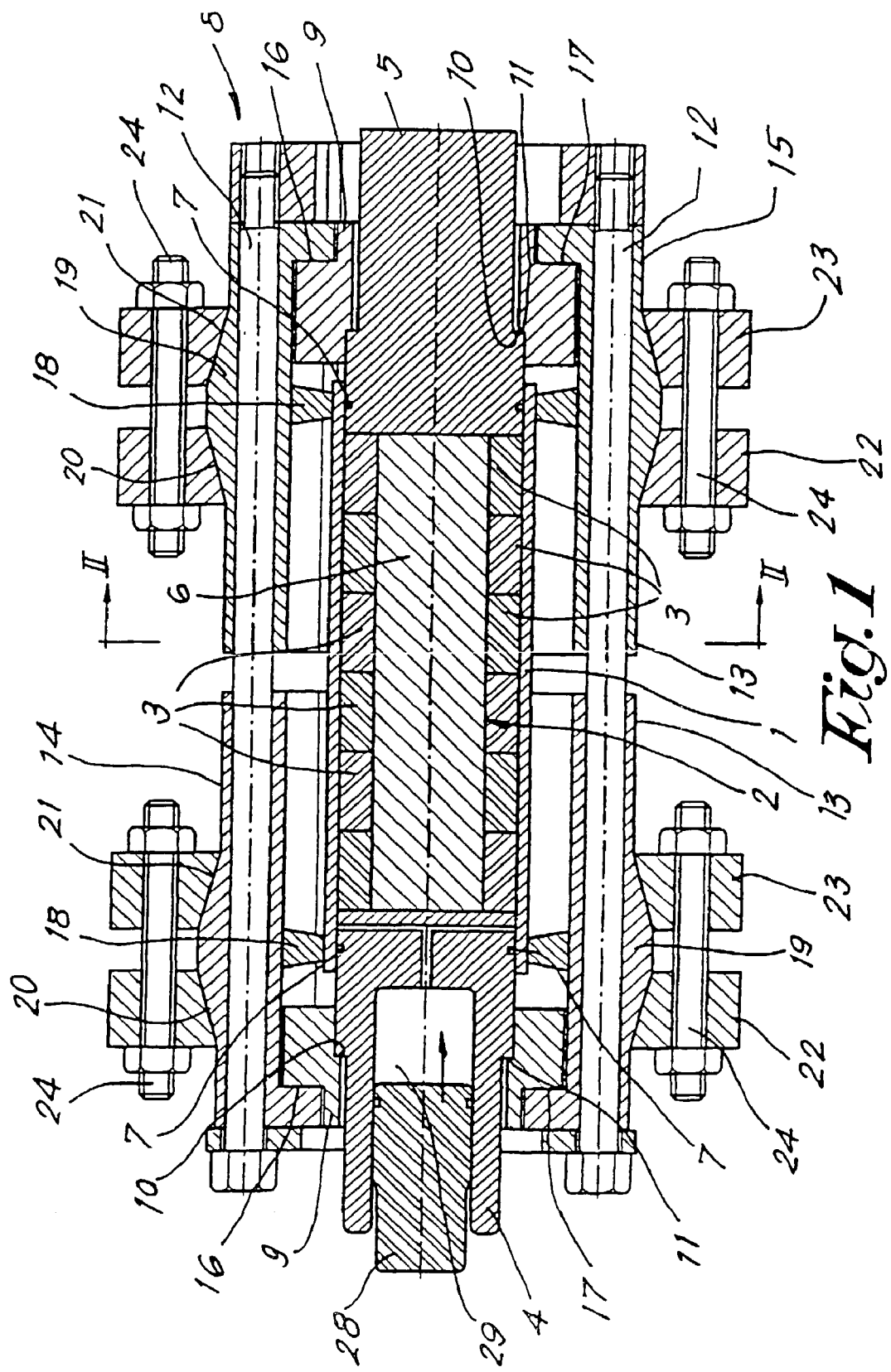
FIG. 1 represents a section of a device during the application of the method according to the invention.
Figure 2:
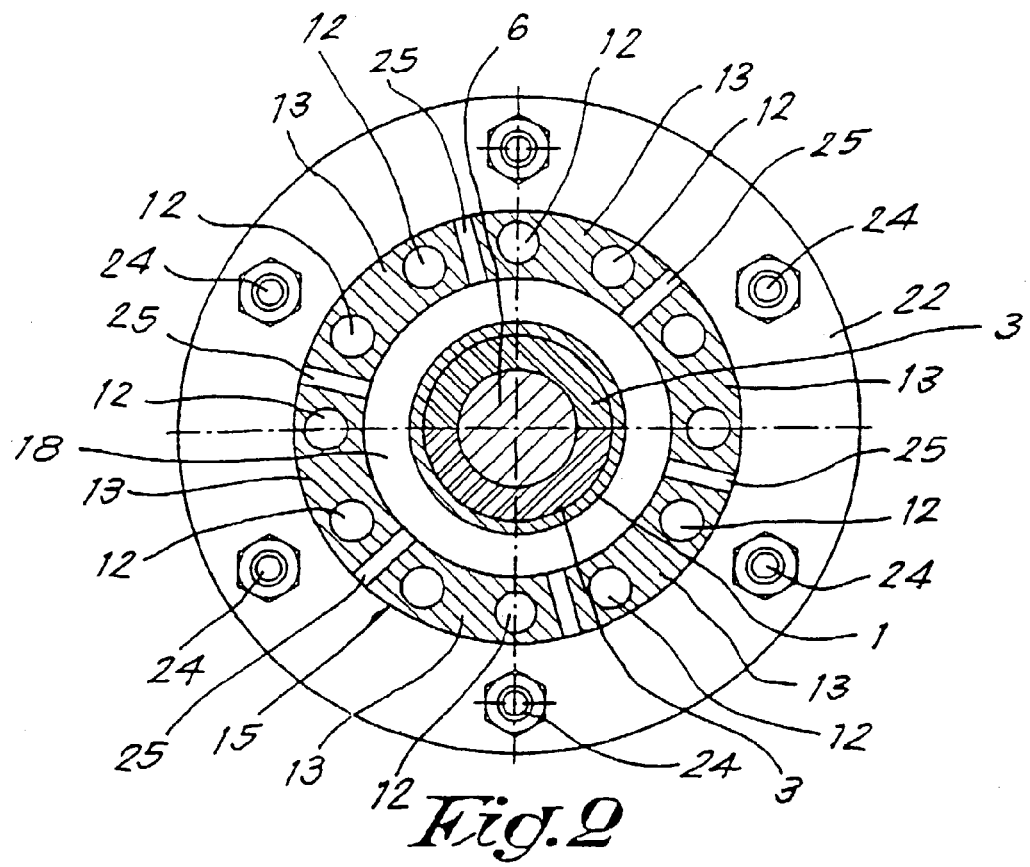
FIG. 2 represents a section according to line II—II in FIG. 1.
Figure 3:
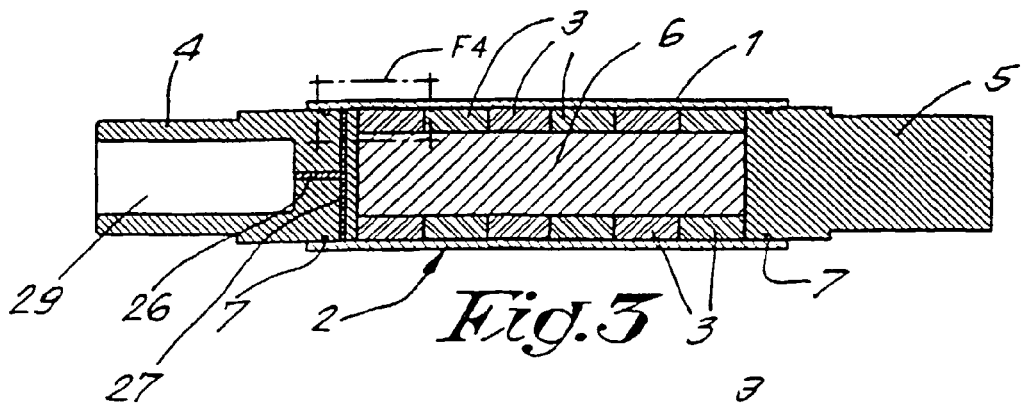
FIG. 3 shows a section of a rotor after completion of the method according to the invention.
Figure 4:
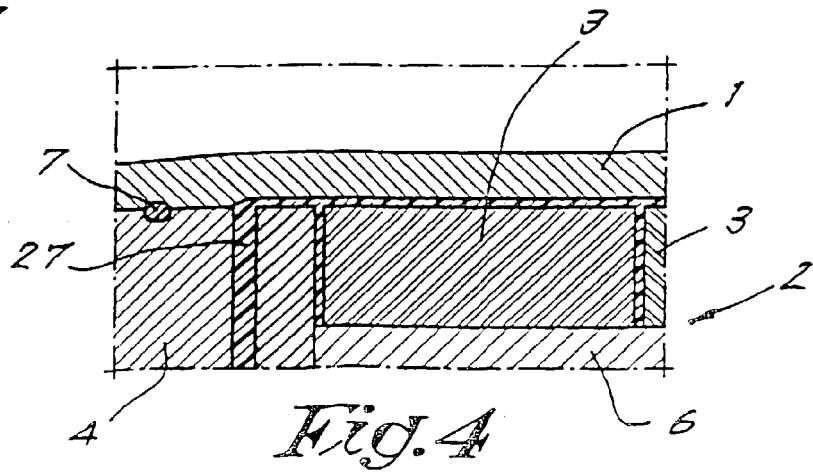
FIG. 4 shows on a greater scale the part indicated by F4 in FIG. 3.

A permanent magnet excited rotor for a high speed electric motor is manufactured by mounting a support sleeve 1 with a pre-tension around the rotor body 2 containing permanent magnets 3.

As shown in the FIGS. 1 to 4, the rotor body 2 is made from a skeleton composed of two end pieces 4 and 5 and a shaft 6 connecting both end pieces, the shaft being surrounded by the magnets 3.

O-ring seals 7 are mounted on the end-pieces 4 and 5.

Rings of permanent magnets 3, shaped as two half circle ring segments for a two pole motor or four quarter circle segments for a four pole motor, are placed around the shaft 6.

The sleeve 1, made from carbon fibres, is slid on to the rotor body 2.

The rotor body 2, surrounded by the sleeve 1, is now clamped in a clamping and injecting device 8 as shown in FIG. 1.

The rotor body 2 is clamped axially via end rings 9 presenting a shoulder 10 abutting a corresponding outwardly projecting shoulder 11 of the end pieces 4 and 5.

The end rings 9 are pulled towards each other by means of bolts 12 by the intermediary of circumferentially spaced segments 13 of two ring halves 14 and 15.

Each of the ring halves 14 and 15 present a shoulder 16 abutting a shoulder 17 of an end ring 9.

By tightening the bolts 12, an adjustable clamping force is exerted by the ring halves 14 and 15 on the end rings 9 and via these end rings 9 on the end pieces 4 and 5.

This clamping prevents that the end pieces 4 and 5 are pressed out from the sleeve 1 if the shaft 6 is not strong enough.

The ends of the sleeve 1 are in radial direction clamped against the end pieces 4 and 5, opposite the seals 7 by the intermediary of the segments 13 of the ring halves 14 and 15 and force transfer rings 18 between these segments 13 and the ends of the sleeve 1.

Each segmented ring halves or half 14 and 15 shows on its outer circumference a portion 19 of increasing and decreasing diameter and consequently presenting two opposite conical surfaces 20 and 21.

Each of these surfaces 20 and 21 of each portion 19 is surrounded by two rings 22 and 23 having a corresponding conical inner side. Both rings 22 and 23 may be pushed towards each other by means of tightening bolts 24 formed by threaded pins and nuts screwed on both ends.

The radial clamping of a sleeve 1 end is performed by tightening the bolts 24 on the corresponding end of the clamping and injecting device 8, said tightening moving the rings 22 and 23 towards each other, resulting in a reduction of the diameter of the segmented ring halve 14 or 15 as the slots 25 between the segments 13 become smaller.

The radial clamping prevents the sleeve 1 expanding at its ends. It also prevents that the seal 7 at the corresponding end; which may be a standard O-ring seal, is pressed outside its groove.

The radial clamping also assures the centring of the whole rotor inside the clamping and injecting device 8.

After the rotor body 2 and the sleeve 1 are clamped an epoxy resin is injected between the sleeve 1 and the rotor body 2.

Therefore, the end piece 4 is provided with injection channels 26 and 27. The channel 26 is axial and connected to several radial channels 27.

The epoxy resin may be supplied externally or internally as shown in FIG. 1, by means of an integrated piston 28, the end piece 4 forming a cylinder and having consequently a cavity 29 for the piston 28, with which cavity 29 the channels 26–27 are in connection.

When the piston 28 is pressed in the cavity 29 filled with epoxy resin, for instance by means of a press, epoxy resin is expulsed from the cavity 29 and injected through the injection channels 26–27. The injected epoxy fills all empty spaces between the magnets 3 and between the magnets 3 and the rotor body 2 and the sleeve 1.

The pressure is maintained until the epoxy resin has cured and possible crimp of the epoxy resin during polymerisation is compensated.

Catalyst may be added to the resin to start polymerisation.

The O-ring seals 7 and the clamping of the sleeve 1 against the end pieces 4 and 5 prevent any leak of the epoxy resin. Between the force transfer rings 18, the sleeve 1 may somewhat expand.

After dismantling the clamping and injection device 8, the rotor containing the rotor body 2, the permanent magnets 3 and the support sleeve 1, may be heated in an oven for after-curing the epoxy resin. Preferably the complete polymerisation takes place at a temperature higher than the future working temperature of the rotor.

The amount of epoxy resin injected and the pressure exerted have to take into account the possible after-crimp due to the after-curing.

Finally, the rotor is machined to its final dimensions and balanced.

The pre-stress of the sleeve 1 is determined mainly by the epoxy-injecting pressure and not by the interference of the sleeve 1 and the rotor body 2.

The sleeve 1 and the epoxy resin prevent that the magnets 3 break due to stress during use of the rotor. Relative soft magnets are useable such as plastic bound magnets.

The total stiffness of the rotor is very high, resulting in a high critical speed of the rotor. The magnets 3 will not move relative to each other when the rotor is brought up to working speed.

There is no need for tight tolerance machining of the surfaces of the magnets 3. Machining tolerances of the sleeve 1, the rotor body 2 and the magnets 3 may be relaxed. The tolerance of the modulus of elasticity of the sleeve 1 is not critical for the level of pre-stress of the sleeve 1. The sleeve 1 may be made from carbon fibres and have a low thermal expansion coefficient.

The rotor body 2 may be cylindrical and is not required to be conical as in some of above mentioned prior art (U.S. Pat. No. 5,568,681).

A shaft 6 is not required and in an embodiment, the shaft may be omitted, for example if the magnets 3 are replaced by two or more segments of a single cylindrical magnet, the sleeve 1 holding the magnet segments and the end pieces 4 and 5 together.

The permanent magnets 3 must not necessarily be rings. If there is no shaft, they may be discs or even magnetic powder mixed with injection fluid.

In another form of embodiment of the invention, the method is as described here before, but the rotor body 2 is manufactured without the magnets 3 and the sleeve 1 is mounted around the shaft 6 and the portions of the end pieces 4 and 5, and magnetic powder is mixed to the epoxy resin which is injected. The amount of epoxy resin is of course much greater than in the above described form of embodiment.

The permanent magnet 3 is consequently formed in situ, by the injected resin.

In both forms of embodiment, both end pieces may be provided with injection channels, and the injection of epoxy may be performed externally by means of an external piston mechanism.

The injected fluid must not necessarily be an epoxy resin. Other thermosetting resins or plastics with relatively low viscosity before polymerisation may be used or even metal alloys with a suitable melting point.

Important is that it is a liquid that solidifies so that it can be injected in liquid form and is solid at the temperatures during working of the rotor.

The invention claimed is:

1. A method for manufacturing a permanent-magnet excited rotor having a rotor body comprising a shaft surrounded by magnets, and arranged for a high speed electric motor, the method comprising steps of:
   mounting a support sleeve with pre-tension around the rotor body;
   expanding the sleeve by a solidifying liquid, wherein the liquid solidifies under operating conditions of the rotor, said liquid being injected under pressure between the sleeve and the rotor body and held under pressure during solidification to thereby tension the sleeve against the rotor body;
   wherein the solidifying liquid fills voids between and among the magnets, the shaft, and the sleeve.

2. The method according to claim 1, wherein the rotor body includes two end pieces, the sleeve being mounted partially around the end pieces, the liquid being injected through at least one of the end pieces.

3. The method according to claim 2, wherein during injection, the ends of the sleeve are clamped in the radial direction against the two end pieces.

4. The method according to claim 2 or 3, wherein the rotor body is clamped in the axial direction to retain the end pieces during the injection.

5. The method according to claim 2, wherein the rotor body is used comprising a shaft joining the end pieces together.

6. The method according to claim 2, wherein the rotor body is used containing permanent magnets, the sleeve surrounding these magnets and at least partially the end pieces.

7. The method according to claim 1, wherein the rotor body is used without pre-manufactured magnets, the magnets being formed in situ by injecting a mixture of the liquid that solidifies and a magnetic powder.

8. The method according to claim 1, wherein the sleeve is formed from carbon fibres and is mounted around the rotor body.

9. The method according to claim 1, wherein the solidifying liquid is selected from the group composed of thermosetting plastics and metal alloys with a suitable melting point.

10. The method according to claim 1, wherein an epoxy resin is the solidifying liquid.

* * * * *